UNITED STATES PATENT OFFICE.

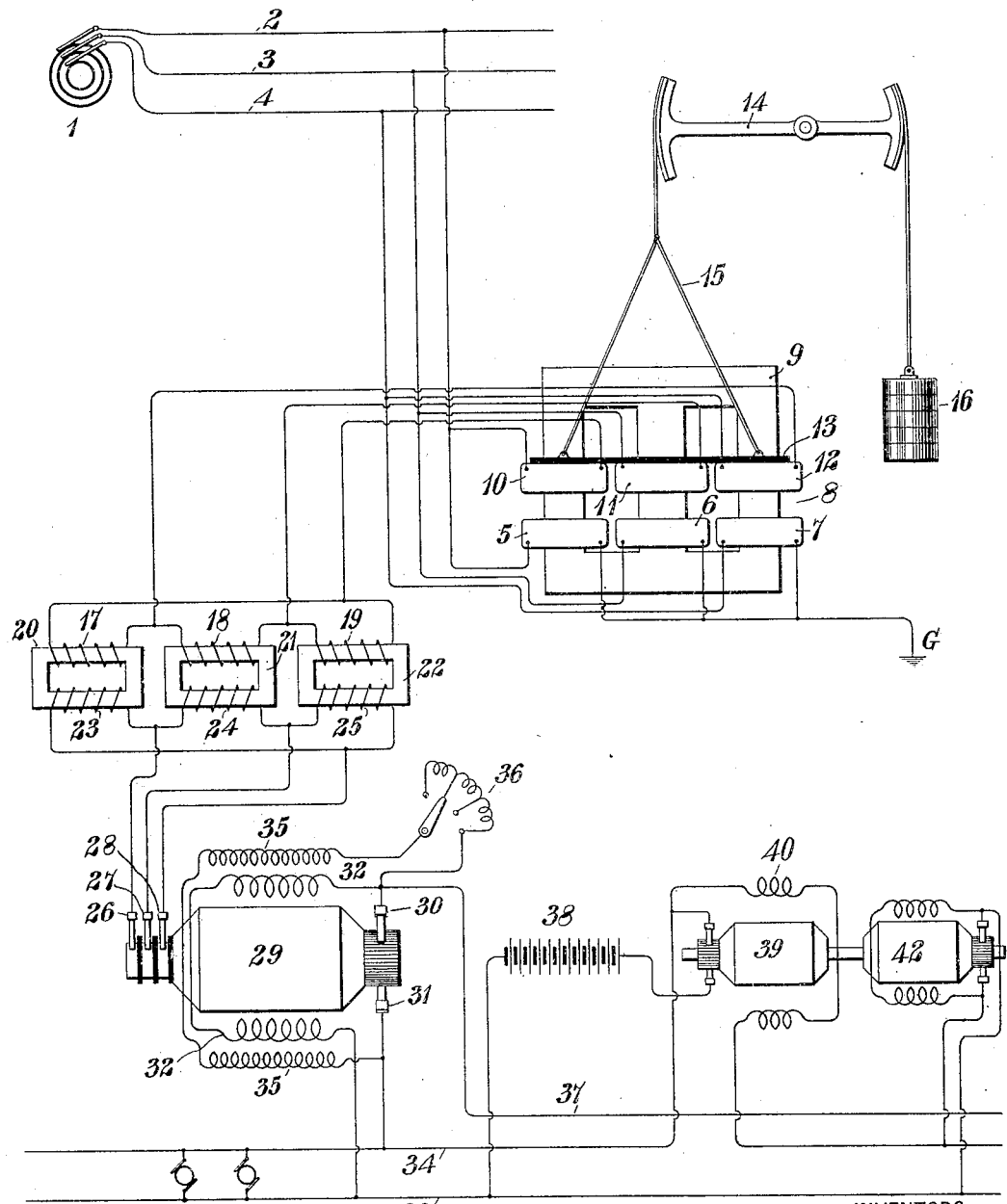

BENJAMIN G. LAMME AND CHARLES F. SCOTT, OF PITTSBURG, AND FRANK CONRAD, OF EDGEWOOD PARK, PENNSYLVANIA, ASSIGNORS TO WESTINGHOUSE ELECTRIC & MANUFACTURING COMPANY, A CORPORATION OF PENNSYLVANIA.

REGULATING MEANS FOR SYSTEMS OF ELECTRICAL DISTRIBUTION.

No. 807,943.   Specification of Letters Patent.   Patented Dec. 19, 1905.

Application filed February 1, 1905. Serial No. 243,710.

*To all whom it may concern:*

Be it known that we, BENJAMIN G. LAMME and CHARLES F. SCOTT, residing at Pittsburg, and FRANK CONRAD, residing at Edgewood Park, in the county of Allegheny and State of Pennsylvania, citizens of the United States, have invented a new and useful Improvement in Regulating Means for Systems of Electrical Distribution, of which the following is a specification.

Our invention relates to means for automatically controlling the operation of rotary converters; and it has for its object to provide means whereby the load upon a rotary converter may be maintained approximately constant within a large working range regardless of the variations in the load upon a direct-current system that may be supplied therefrom.

Rotary converters have heretofore been so constructed and combined with auxiliary devices that the voltage impressed upon the direct-current system supplied therefrom may remain practically constant or may rise as the load upon the system increases. If, however, it is desired to employ storage batteries in connection with rotary converters, it is essential that the voltage impressed upon the direct-current system by the rotary converters shall decrease as the load upon the system increases, since storage batteries deliver decreasing electromotive forces as the current demand increases.

Our invention provides in a system embodying one or more rotary converters and a storage battery means for causing the direct-current electromotive force of the rotary converters to decrease as the load upon the system increases, this means comprising automatic voltage-regulators located between the alternating-current-supply system and the rotary converters, whereby the alternating-current electromotive force applied to the rotary converters is varied inversely as the load upon the direct-current system varies. The voltage-regulators may be and preferably are so adjusted as to secure the following results under the various stated conditions of operation.

If the service requires less than a normal full-load current output of the rotary converters, the electromotive force of the rotary converters will rise slightly above that corresponding to full-load output and the open-circuit electromotive force of the storage battery and the storage battery is then charged.

When the service requires the normal rotary converter output, the current will be supplied to the direct-current system by the rotary converters alone at a voltage corresponding to that load, which is also equal to the open-circuit electromotive force of the storage battery.

When the demand for current upon the direct-current system exceeds the normal rotary converter output, the regulators which are located between the alternating-current-supply system and the rotary converters cause the alternating-current voltage supplied to the rotary converters to diminish, and consequently current is delivered to the direct-current system at a reduced voltage. The excess of current demanded by the direct-current system over the normal rotary converter output is then supplied by the storage battery, since the voltage of the system is less than the open-circuit electromotive force of the battery and the rotary converters continue to deliver approximately their normal rated output of current.

If the demand for current upon the direct-current system is greater than the normal rated full-load output of the rotary converters plus the maximum allowable current output from the battery, the voltage-regulators cease to operate, and a constant alternating-current electromotive force is delivered to the rotary converters. The additional load upon the direct-current system is then carried as an overload upon the rotary converters, the direct-current electromotive force remaining approximately constant. Under this condition the current which the rotary converters may safely deliver in addition to that delivered by the storage battery is determined by the capacity of the rotary converters.

The single figure of the accompanying drawing illustrates a system embodying our invention.

Alternating-current energy is supplied from any suitable source 1 to distributing-conductors 2, 3, and 4, which are respectively connected to one set of corresponding terminals of primary windings 5, 6, and 7 of a voltage-regulator 8, the other set of corresponding terminals being connected together and grounded at G. The primary windings 5, 6, and 7 are mounted in stationary positions upon the legs of a magnetizable core 9, and secondary windings 10, 11, and 12 are secured to a suitable frame 13 so as to be movable upon the legs of the core toward and from the primary coils. The frame 13 is suspended from the end of a lever 14 by means of a cable or chain 15, weights 16 being suspended from the opposite end of the lever 14 for the purpose of adjusting the conditions of operation of the regulator.

The voltage-regulator 8 operates in a manner similar to the well-known devices employed for the purpose of regulating the current in arc-lighting circuits. When currents traverse the circuits of the primary and secondary coils of the regulator, these coils repel each other, the strength of the repulsive action being proportional to the amounts of the currents that traverse the windings. As the coils separate the magnetic leakage between them increases, and consequently the voltage at the terminals of the secondary windings decreases.

Corresponding terminals of the secondary windings 10, 11, and 12 of the voltage-regulator 8, constituting one set, are connected, respectively, to the supply-conductors 2, 3, and 4, and the corresponding terminals constituting the other set are connected to delta-connected primary windings 17, 18, and 19 of transformers 20, 21, and 22. Secondary windings 23, 24, and 25 of the transformers 20, 21, and 22 are delta-connected and are also connected to brushes 26, 27, and 28 at the alternating-current end of a rotary converter 29.

Direct current is supplied from the commutator-brushes 30 and 31 of the rotary converter 29, through series field-magnet winding 32, to supply conductors 33 and 34 of the direct-current system. The rotary converter 29 is also provided with a shunt field-magnet winding 35, and the amount of current supplied thereto may be adjusted by means of a suitable rheostatic device, such as that shown at 36. If more than a single rotary converter is employed in the distributing system, an equalizing connection, such as that indicated at 37, should be made between the terminals of the armature-windings, which are connected to terminals of the series field-magnet windings.

A storage battery 38 and a booster-generator 39 are connected in series between the supply-conductors 33 and 34, booster 39 being provided with a field-magnet winding 40, that is connected in series with the conductor 34 in order that the charge and discharge of the battery may be dependent largely upon the current demand upon the system. The booster may be operated by any suitable means, such as a motor 42, which may derive its energy from supply-conductors 33 and 34 or from any other suitable source.

While we have shown a specific form of voltage-regulator, it is to be understood that any other form of voltage-regulator may be employed which may be adjusted so that the alternating and direct current voltages shall decrease within limits as the current demand increases. It is also to be understood that the transformers are not essential elements of our system and are here shown only because they are usually employed to reduce the alternating-current voltage delivered to the rotary converters.

Occasion may arise in the use of our system when it will be desirable to have the load upon the rotary converters increase gradually, rather than remain substantially constant, as the demand for current upon the system increases, in which event the voltage-regulator may be adjusted to secure the desired conditions of operation.

We claim as our invention—

1. The combination with an alternating-current-supply system, a rotary converter and a direct-current-distributing system, of a regulator located between the alternating-current-supply system and the rotary converter by means of which the alternating-current electromotive force supplied to the rotary converter may be automatically decreased as the load upon the direct-current system increases.

2. The combination with an alternating-current-distributing system, a rotary converter and a direct-current-supply system, of means for causing the alternating electromotive force supplied to the rotary converter to decrease automatically as the load upon the direct-current system increases.

3. The combination with an alternating-current-supply system, a rotary converter and a direct-current-distributing system, of means for automatically causing the voltage supplied to the direct-current system by the rotary converter to vary approximately inversely as the load upon the direct-current system varies.

4. The combination with an alternating-current-supply system, a rotary converter and a direct-current-distributing system, of a regulator located between the alternating-current-supply system and the rotary converter by means of which the load upon the rotary converter may be automatically maintained approximately constant.

5. The combination with an alternating-current-supply system, a rotary converter and a direct-current-distributing system, of means for automatically insuring an approximately constant load upon the rotary converter notwithstanding variations of load upon the direct-current system.

6. The combination with an alternating-current-supply system, a rotary converter and a direct-current-distributing system, of means for automatically maintaining the load upon the rotary converter approximately constant regardless of variations in the load upon the direct-current system, and a storage battery which supplies the current demand in excess of that to be derived from the rotary converter.

7. The combination with an alternating-current-supply system, a rotary converter and a direct-current-distributing system, of a regulator located between the alternating-current-supply system and the rotary converter by means of which the voltage of the current supplied to the direct-current system may be caused automatically to vary approximately inversely as the load upon the system varies, and a storage battery which supplies current to the direct-current system when the direct-current voltage falls below a predetermined value.

8. The combination with an alternating-current-supply system, a rotary converter and a direct-current-distributing system, of a regulator located between the alternating-current-supply system and the rotary converter by means of which the voltage of the current supplied to the direct-current system may be caused automatically to vary approximately inversely as the load upon the system varies, and a storage battery which supplies the current to the direct-current system when the direct-current voltage falls below a predetermined value and which is charged when the direct-current voltage exceeds this predetermined value.

9. The combination with an alternating-current-supply system, a rotary converter and a direct-current-distributing system, of a regulator located between the alternating-current-supply system and the rotary converter by means of which the alternating-current voltages applied to the rotary converter may be varied automatically between predetermined limits.

10. The combination with an alternating-current-supply system, a rotary converter and a direct-current-distributing system, of a regulator located between the alternating-current-supply system and the rotary converter by means of which alternating-current voltages applied to the rotary converter may be varied automatically between predetermined limits, and a storage battery which supplies current to the direct-current system when the direct-current voltage falls below a predetermined value.

11. The combination with an alternating-current-supply system, a rotary converter and a direct-current-distributing system, of a constant-current regulator located between the alternating-current-supply system and the rotary converter, and a source of energy which supplies current to the direct-current system when the direct-current voltage falls below a predetermined value.

12. The combination with an alternating-current-supply system, a rotary converter and a direct-current-distributing system, of a voltage-regulator by means of which the alternating-current electromotive force applied to the rotary converter is varied automatically between predetermined limits and the load upon the rotary converter is maintained approximately constant between those voltage limits, and a storage battery which supplies energy to the direct-current system when the direct-current voltage falls below a predetermined value, but which ceases to deliver current after a maximum, allowable limit is reached, at which point the rotary converter then operates at a constant voltage and carries the load as an overload.

13. The combination with an alternating-current-supply system, a rotary converter and a direct-current-distributing system, of means whereby the voltage of the direct-current system is varied automatically between limits approximately inversely as the load upon that system, a storage battery which supplies energy to the direct-current system when the voltage of that system falls below a predetermined value, and a booster for raising the voltage delivered by the storage battery to the direct-current system.

14. The combination with an alternating-current-supply system, a rotary converter and a direct-current-distributing system, of means for automatically varying the voltage of the direct-current system between limits approximately inversely as the load upon that system varies, a storage battery which supplies energy to the direct-current system when the voltage of that system falls below a predetermined limit, and a booster which varies the electromotive force of the current delivered by the battery to the direct-current system approximately inversely as the load upon that system varies.

15. The combination with an alternating-current-supply system, a rotary converter and a direct-current-distributing system, of a constant-current regulator located between the alternating-current system and the rotary converter.

16. The combination with an alternating-current-supply system, a rotary converter, a storage battery and a direct-current-distributing system, of a constant-current regulator located between the alternating-current system and the rotary converter.

17. The combination with an alternating-current-supply system, a rotary converter, a storage battery and a direct-current-distributing system, of a regulator located between the alternating-current-supply system and the rotary converter by means of which the load upon the rotary converter may be caused automatically to vary in accordance with a stated law as the current demand upon the direct-current system varies.

18. The combination with an alternating-current-supply system, a rotary converter, a storage battery, and a direct-current-distributing system, of a regulator located between the alternating-current-supply system and the rotary converter by means of which the load upon the rotary converter may be caused automatically to increase only slightly as the demand for current upon the direct-current system increases.

In testimony whereof we have hereunto subscribed our names this 30th day of January, 1905.

BENJ. G. LAMME.
CHAS. F. SCOTT.
FRANK CONRAD.

Witnesses:
J. C. DIECKMANN,
BIRNEY HINES.